US010589248B1

(12) United States Patent
Doris et al.

(10) Patent No.: US 10,589,248 B1
(45) Date of Patent: Mar. 17, 2020

(54) CHEMICAL REACTORS SYSTEMS AND METHODS FOR MULTI-PHASE REACTIONS

(71) Applicants: Palo Alto Research Center Incorporated, Palo Alto, CA (US); Xerox Corporation, Norwalk, CT (US)

(72) Inventors: Sean Doris, San Francisco, CA (US); Warren Jackson, San Francisco, CA (US); Naveen Chopra, Mississauga (CA); Bradley Rupp, San Francisco, CA (US); Robert Street, Palo Alto, CA (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 0 days.

(21) Appl. No.: 16/458,098

(22) Filed: Jun. 30, 2019

(51) Int. Cl.
*B01J 10/00* (2006.01)
*B01J 19/08* (2006.01)
*B01J 19/00* (2006.01)

(52) U.S. Cl.
CPC ............ *B01J 10/00* (2013.01); *B01J 10/002* (2013.01); *B01J 10/007* (2013.01);
(Continued)

(58) Field of Classification Search
CPC ........ B01J 10/002; B01J 10/007; B01J 10/00; B01J 19/0013; B01J 19/088; B01J 2219/00051; B01J 2219/00056; B01J 2219/00058; B01J 2219/0006; B01J 2219/00063; B01J 2219/00159; B01J 2219/00162; B01J 2219/00164; B01J 2219/00177; B01J 2219/00186; B01J 2219/00193; B01J 2219/002; B01J 2219/00222; B01J 2219/00227; B01J 2219/00229; B01J 2219/00234; B01J 2219/0803; B01J 2219/0805; B01J 2219/0875; B01J 2219/0877; B01J 2219/0879; B01J 2219/0881; B01J 2219/0884; B01J 2219/0886;
(Continued)

(56) References Cited

U.S. PATENT DOCUMENTS 6,152,181 A 11/2000 Wapner et al.
6,360,775 B1 3/2002 Barth et al.
(Continued)

OTHER PUBLICATIONS

Plutschack, M. B., Pieber, B., Gilmore, K. & Seeberger, P. H. The Hitchhiker's Guide to Flow Chemistry. Chem. Rev. (2017). doi:10.1021/acs.chemrev.7b00183.
Elvira, K. S., Solvas, X. C., Wootton, R.C.R. & deMello, A. J. The past, present and potential for microfluidic reactor technology in chemical synthesis. Nat. Chem. 5, 905-915 (2013).
Mallia, C. J. & Baxendale, I. R. The Use of Gases in Flow Synthesis. Org. Process Res. Dev. 20, 327-360 (2016).
(Continued)

*Primary Examiner* — Lessanework Seifu

(57) ABSTRACT

One embodiment provides a chemical reactor, which can comprise a substrate for facilitating chemical reactions occurring at triple-phase boundaries. One possible substrate may further comprise a set of dynamically controllable sites and/or pixels upon which control signals may affect a desired formation of gas bubbles over an active catalytic (or other desired) solid surface in a liquid flow—wherein a chemical reaction in two or more phase boundaries may occur. In yet another embodiment, a control algorithm may send control signals to controllable sites/pixels to maximize the operation of the reactor according to a desired metric (e.g., product formation) that may input a set of sensor data to affect its control.

20 Claims, 7 Drawing Sheets

(52) U.S. Cl.
CPC ......... *B01J 19/0013* (2013.01); *B01J 19/088* (2013.01); *B01J 2219/002* (2013.01); *B01J 2219/00051* (2013.01); *B01J 2219/00162* (2013.01); *B01J 2219/00164* (2013.01); *B01J 2219/00177* (2013.01); *B01J 2219/00186* (2013.01); *B01J 2219/00227* (2013.01); *B01J 2219/00234* (2013.01); *B01J 2219/0805* (2013.01); *B01J 2219/0877* (2013.01)

(58) Field of Classification Search
CPC .......... B01J 2219/0888; B01J 2219/089; B01J 2219/0892
See application file for complete search history.

(56) References Cited

U.S. PATENT DOCUMENTS

| | | |
|---|---|---|
| 8,342,207 B2 | 1/2013 | Raccurt et al. |
| 2007/0137509 A1 | 6/2007 | Fork |
| 2008/0230458 A1 | 9/2008 | Lean et al. |
| 2012/0168131 A1 | 7/2012 | Gavillet et al. |

OTHER PUBLICATIONS

Hessel, V., Angeli, P., Gavriilidis, A. & Löwe, H. Gas-Liquid and Gas-Liquid-Solid Microstructured Reactors: Contacting Principles and Applications. Ind. Eng. Chem. Res. 44, 9750-9769 (2005).

Zhao, Y. & Cho, S. K. Micro air bubble manipulation by electrowetting on dielectric (EWOD): transporting, splitting, merging and eliminating of bubbles. Lab. Chip 7, 273-280 (2007).

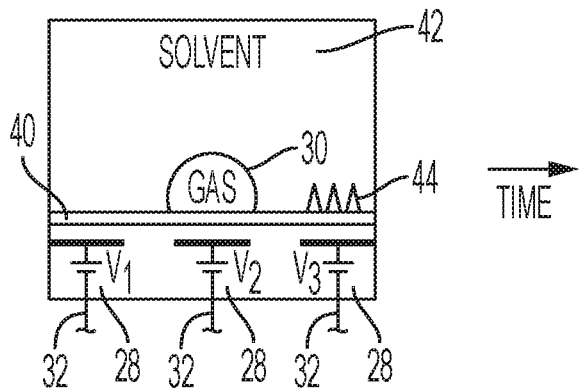 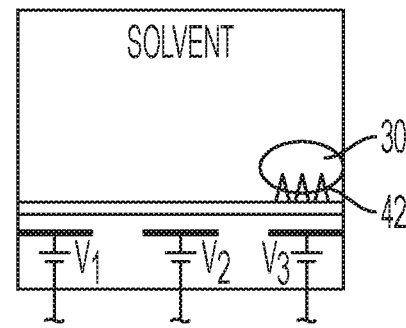
FIG. 3a  FIG. 3b
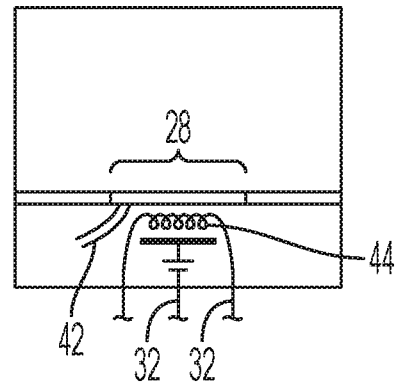 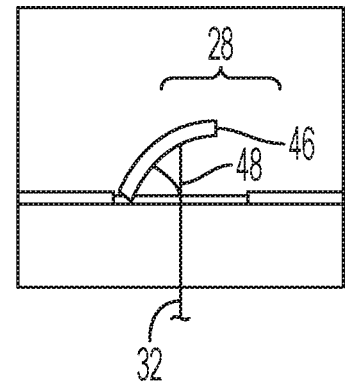
FIG. 4a  FIG. 4b

CHEMICAL REACTORS SYSTEMS AND METHODS FOR MULTI-PHASE REACTIONS

BACKGROUND

Numerous chemical reactors are known in the art, including batch chemical reactors, flow chemical reactors and a variety of other chemical reactor configurations. These chemical reactors have a number of advantages to scale up production of products from a set of reactants. Such advantages include improved thermal and mass transfer, easier scale-up, and safer operation. Many industrially relevant reactions involve gaseous reactants, either dissolved in the reaction solvent or bubbled through the solvent. In many cases, given the low solubility of gases in most liquids, the gas is usually bubbled through the reaction solvent, and the reaction happens at the gas-liquid interface. Often a heterogeneous catalyst is used to accelerate the reaction. In this case, the reaction occurs at the triple-phase boundary between the gaseous reactant, liquid solvent/reactants, and solid catalyst. Controlling this triple-phase boundary is desired for controlling the reaction rate and selectivity for reactions involving gaseous reactants and solid-state catalysts.

Several approaches are known in the scientific literature for controlling the liquid-gas interface in flow reactors. In one approach, gas and liquid streams are flowed together at carefully controlled pressures, allowing for the formation of annular or plug flow gas-liquid mixtures. Falling film reactors, where a gaseous reactant flows past a thin film of liquid that is being dragged by gravity, have also been implemented. Additionally, designs incorporating coaxial tubes consisting of gas permeable membranes or meshes have been used to control the mixing and interface between gaseous and liquid reactants.

SUMMARY OF THE APPLICATION

Several embodiments of the present application comprising systems and methods of multi-phase chemical reaction chambers are disclosed.

In one embodiment, a multi-phase chemical reaction chamber is disclosed comprising: a substrate, the substrate configured to receive a flow of chemicals for reacting within the chamber; a set of dynamically controllable pixels, the pixels further comprising a solid surface, the solid surface comprising one of the phases of a multi-phase reaction occurring within the chamber; a controller, the controller further comprising a processor controlled under a computer-readable set of instructions and, when read by the processor causes the controller to send control signals to the set of dynamically controllable pixels, to perform the following: energize a subset of the dynamically controllable pixels to carry a desired voltage level, the energized pixels configured to create the formation of gas bubbles over the pixels, the gas bubbles comprising one of the phases of the multi-phase reaction occurring within the chamber.

In another embodiment, a method for controlling pixels within a multi-phase chemical reaction chamber is disclosed, the chemical chamber comprising a set of dynamically controllable pixels, the pixels further comprising a solid surface, the solid surface possibly being one of the phases of a multi-phase reaction occurring within the chamber, the method comprising: receiving input data from a set of sensors, the sensors detecting desired conditions of the chemical reaction occurring within the chamber; based on desired metrics, sending control signals to the set of dynamically controllable pixels to optimize the chemical reaction.

In yet another embodiment, a modular, multi-phase chemical reaction chamber configured to fit and operate within a larger chemical reactor is disclosed.

Other features and advantages of the present system are presented below in the Detailed Description when read in connection with the drawings presented within this application.

BRIEF DESCRIPTION OF THE DRAWINGS

FIGS. 3A and 3B show a side cut view of a set of controllable pixels of a suitable chemical chamber.

FIGS. 4A and 4B show a side cut view of a set of alternative embodiments of controllable pixels.

DETAILED DESCRIPTION

The following description is presented to enable any person skilled in the art to make and use the embodiments, and is provided in the context of a particular application. Various modifications to the disclosed embodiments will be readily apparent to those skilled in the art, and the general principles defined herein may be applied to other embodiments and applications without departing from the spirit and scope of the present disclosure. Thus, the present application is not limited to the embodiments shown, but is to be accorded the widest scope consistent with the principles and features disclosed herein.

Overview

Many of the chemical reactor chamber embodiments described herein allow for good mixing of gas and liquid flows, including possible temporal and/or spatial control over a triple-phase boundary. Such embodiments having real-time, spatial control over the triple-phase boundary is desirable for fine-tuning the reaction rate and selectivity as a function of flow rate and position within the channel, which can be useful in improving the yield and selectivity reactions involving gaseous reactants.

It will be appreciated that the present specification encompasses the use of a described chemical reactor chamber in all manners of known chemical reactors, including but not limited to: batch reactors, flow reactors and the like. In addition, a present chemical reactor chamber may comprise the entire reactor itself—or the present reactor chamber itself may be constructed in a small form factor and may be inserted into any existing chemical reactor to improve its performance.

One Embodiment of Triple-Phase Chemical Reactor Chamber

Figure 1:
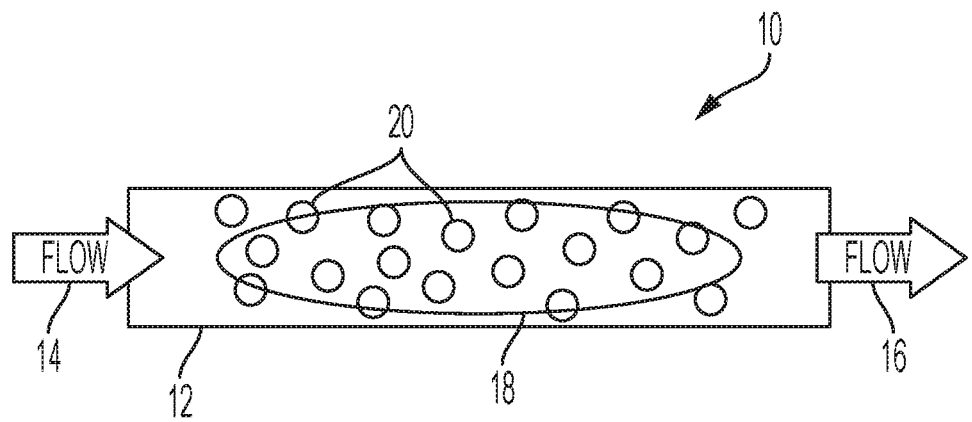
FIG. 1 shows a conventional flow chemical reactor.

FIG. 1 depicts one embodiment of a conventional flow reactor 10. Reactor 10 may comprise chamber 12 which may receive an input flow 14 of either liquid and/or gaseous chemical reactants. After reactions take place within the chamber 12, the chamber outputs an output flow 16 of chemical products. Within chamber 12, there may be a solid surface 18 upon which one or more solid surface catalysts may be placed. Gas reactants 20 may be bubbled (or otherwise introduced) in the flow to comprise a chemical reaction involving reactions in two or more phases.

Figure 2:
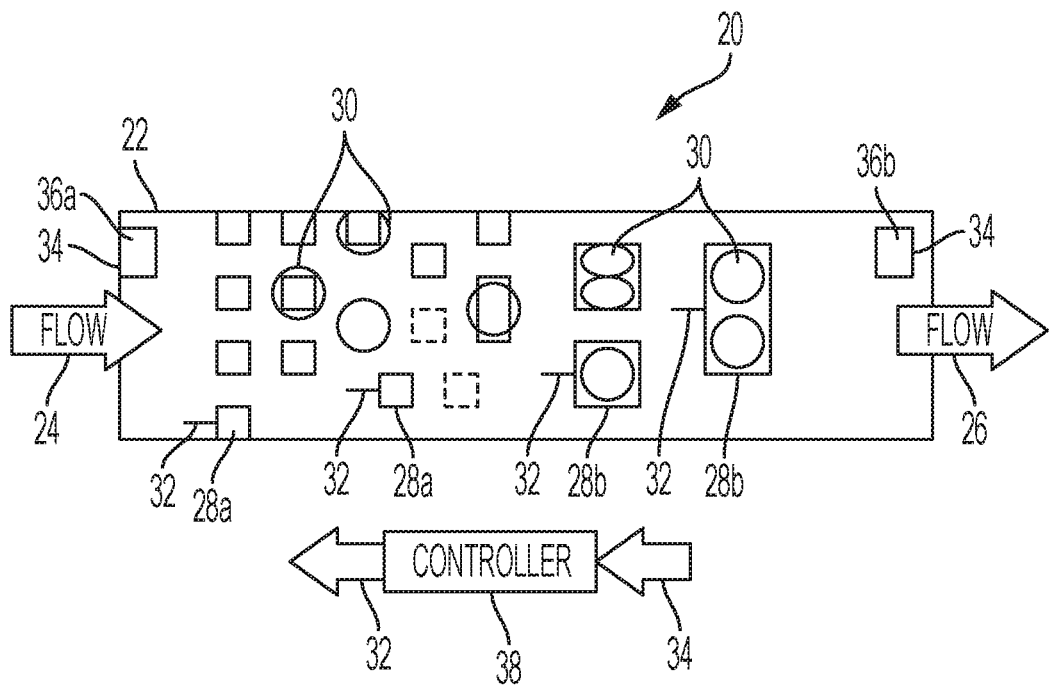
FIG. 2 shows a chemical chamber as made in accordance with the principles of the present application.

FIG. 2 depicts one embodiment of a chemical reactor chamber made in accordance with the principles of the present application. Reactor 20 may comprise a chamber 22 that receives an input flow 24 of either liquid and/or gaseous chemical reactants—and outputs flow 26 of chemical products after desired chemical reactions occur within chamber 22. Gas formations and/or bubbles 30 may be introduced into chamber 22 to react with input flow 24.

Chamber 22 comprises a substrate upon which a set of dynamically addressable and controllable areas/pixels 28a are situated. The substrate of chamber 22 allows an input and/or output flow of chemical (e.g., gases, liquids, solid particles in suspension or the like). Pixels 28a may have an advantageous coating (or otherwise comprise) a surface that may be one or more catalysts for desired chemical reactions within chamber 22. Such a solid surface may be one of the phases in a multi-phase reaction chamber to aid in the formation of desired chemical products. In other embodiments, pixels 28a may be coated with a solid substance that may be consumed in the reaction—and may be re-coated when the solid coating is substantially consumed for future reactions. The use of the term "pixel" in the context of this application indicates an area on the substrate that may be individually addressed and/or controllable to affect some functionality at and/or near that area. Some examples comprise temperature/heat, voltage, introduction of products and/or reactants, catalysts etc. Other examples of functionality being controlled are discussed further in the specification. In one embodiment, pixels 28 may be gated flow channels introducing liquids, gases and/or particles in suspension or the like. The mass flow into and out of the system may come from the flow gated pixels as well as from ports, as discussed below.

Pixels 28a may comprise control lines 32 which place pixels 28a into electrical communication with controller 38. Control lines 32 conduct control signals from a controller 38 for a variety of control structures and/or controllable features that may reside on or near the pixels. For example, in one embodiment (and as will be discussed in greater detail below), pixels 28a may be energized to a given voltage and/or charge (e.g., to an ON or OFF state or the like) in order to affect an electrowetting pixel. Such an electrowetting pixel, once switched into an OFF state (i.e., so that a reactant solvent would not wet the pixel), may be an area where gas bubbles 30 in the reaction mixture may preferentially deposit on the pixel area.

In addition to control signals 32, controller 38 may receive input signals 34 from a set of sensors 36a and 36b. Sensors 36a and 36b may be advantageously placed within the chamber 22 to monitor status of the reaction process in real-time. The number and type of sensors that may be employed is varied and they may include (but not limited to): temperature, input flow rate and composition (as shown as flow 24), output flow rate and composition (as shown as flow 26), pH, pressure, camera, chemical assays to determine the amount of reactants, intermediate products and final products over time and space within the chamber. As will be discussed in greater detail below, these sensors and their data may be input into control algorithms, processed by the controller. In response to such sensor data, controller 38 sends control signals along control lines 32 to affect activation of the controllable features/structures at or near the pixels. It will also be appreciated that pixels themselves may be sensors and/or operate as sensors themselves, if desired. For merely one example, pixels may heat/cool the area, change local pressure and other conditions may be affected. It may be desirable to have the pixels comprising such sensors themselves.

Also shown in FIG. 2, some pixels may be activated (i.e., represented by the solid boxes) and some pixels may not be so activated (i.e., represented by the dotted boxes) over both space and time—depending upon the control process affected by the controller. In addition, it may be seen that two or more neighboring pixels (28b) may be activated to increase the active area at a given space and/or time consideration. Such process considerations will be discussed in greater detail below.

One Pixel Embodiment

FIGS. 3a and 3b depict a side cut-view of the chamber 22, showing three pixels 28 in proximity with each other. Each pixel 28 comprises a control line 32 that energizes the pixel to a desired voltage level (e.g., $V_1$, $V_2$, $V_3$). Pixels 28 may be placed under (or alternatively, formed onto or contiguous with) a layer of solid material 40 to form a solid phase of a multi-phase reaction. Solid material 40 may be either a catalytic coating or a coating that is consumed in the reaction (which may be replaced/replenished at a later time, if desired).

Pixel 28 may be constructed and controlled in a variety of manners—and, in one embodiment, as an electrowetting pixel. As such, pixels may be actuated in such a manner to control the location of e.g., gas bubbles. For one example, in FIG. 3a, $V_1$ and $V_3$ may be set to a non-zero voltage and $V_2$ set to zero voltage. In such a case, non-zero voltage pixels encourage solvent 42 (e.g., the liquid reactant in the multi-phase reaction) to "wet" the area over the pixel—while a pixel set to zero voltage discourages the solvent to wet the area over the pixel, thus localizing gas bubble 30 over that particular pixel.

FIG. 3b shows that gas bubbles 30 may be encouraged to move along the chamber by changing the voltage actuation of the pixels. For example, $V_1$ and $V_2$ may be set to a non-zero voltage and $V_3$ set to zero voltage to affect the movement of gas bubble 30 as depicted.

One alternative embodiment of electrowetting pixel 28 is also seen in FIG. 3b. The far right pixel 28 may intentionally have an irregular surface 44. When V3 is set to zero, gas bubble 30 is encouraged to form over irregular surface 44. Control signal may modulate the voltage over a small time period to be alternatively zero and non-zero. This modulation may tend to encourage the gas bubble to move upwards and downwards as desired over the irregular surface. In such a case, the pixel area may be quickly introduced to the solvent 42 and, when the voltage returns to zero, the gas bubble may return to the greater surface of the solid material 40. In this case, it may be possible to encourage faster reaction rate at the triple-phase boundary. Such modulation may be controlled by the control process, in response to sensor data that may indicated amount of chemical product formed over time and/or space within the chamber.

Other Pixel Embodiments

FIGS. 4a and 4b depict other possible pixel embodiments. FIG. 4a shows pixel 28 as comprising additional controllable structures. For example, pixel 28 may comprise one or more ports 42 that, under control of the controller, may introduce either liquid, gas and/or solid suspension products proximate to the solid material as desired. The introduction of these reactants may be controlled by the opening and/or closing of the port under signal from the controller. In addition, energizing element 44 may be either a heating element or a light emitting element to advantageously emit heat and/or light proximate to the solid material—e.g., the energizing element possible actuated by the controller as desired.

FIG. 4*b* depicts pixel 28 with two possible controllable features. Pixel 28 may comprise a deformable, flexible surface 46 (e.g., a piezo-electro structure or the like) to deform the surface of the pixel, as desired under control of the controller. Another controllable feature may be a deflectable feature 48 which, if activated, may gimbal the pixel in a desired direction (e.g., either into or away from the flow of chemical products). Such deflectable feature may be formed like a Micro-Electro-Mechanical Systems (MEMS) structure (or other deflectable feature as is known in the art).

Figure 5:
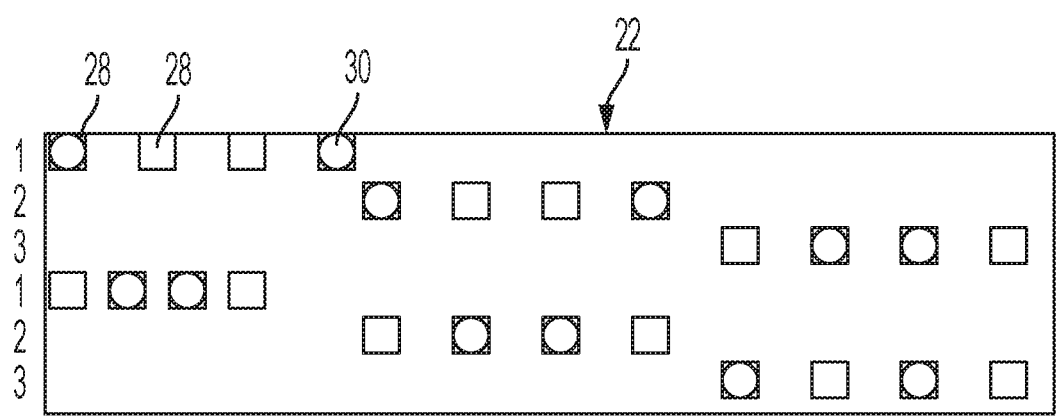
FIG. 5 shows yet another embodiment of a set of controllable pixels within a suitable chemical chamber.

In yet another pixel embodiment, FIG. 5 depicts that chamber 22 may be constructed in a number of spatial catalyst patterns and electro-wetting pixel addressing schemes. As shown in FIG. 5, one embodiment comprises a set of stripes (labeled "1, 2, 3", as repeated) of (possibly) different catalyst compositions or loading along the chamber 22 and use the electro-wetting pixels 28 to position the triple-phase boundary over the desired catalyst region. This embodiment allows the catalyst composition or loading in the triple-phase reaction zone to be varied in real time, allowing for real-time reaction optimization with a single flow reactor. This approach could be used for both preparative synthesis as well as catalyst screening and reaction optimization. It may also be used to control parasitic and/or back reactions.

This example of a catalyst pattern and electro-wetting pixel addressing scheme may be controlled by the controller. As shown, a set of stripes of differing catalyst composition or loading are present (e.g., labelled 1, 2, and 3). The electro-wetting pixels can be addressed to move the gaseous reactant 30 and the triple-phase boundary to regions 1, 2, and 3 as a function of time or position within the flow reactor.

In yet another embodiment, the reaction chamber need not be constructed as a single flat surface over which products and reactants flow. In fact, the present specification encompasses a 3-D structure where multiple substrates may be stacked or otherwise placed over each other in a third dimension. In one such embodiment, it may be possible to construct the chamber as a volumetric array of such substrates comprising pixels for effective transformation of the reactants. In another embodiment, it is possible to construct sinuous path reactors to maximize reaction efficiency for a give reactor volume and throughput.

Control Embodiments

Figure 6:
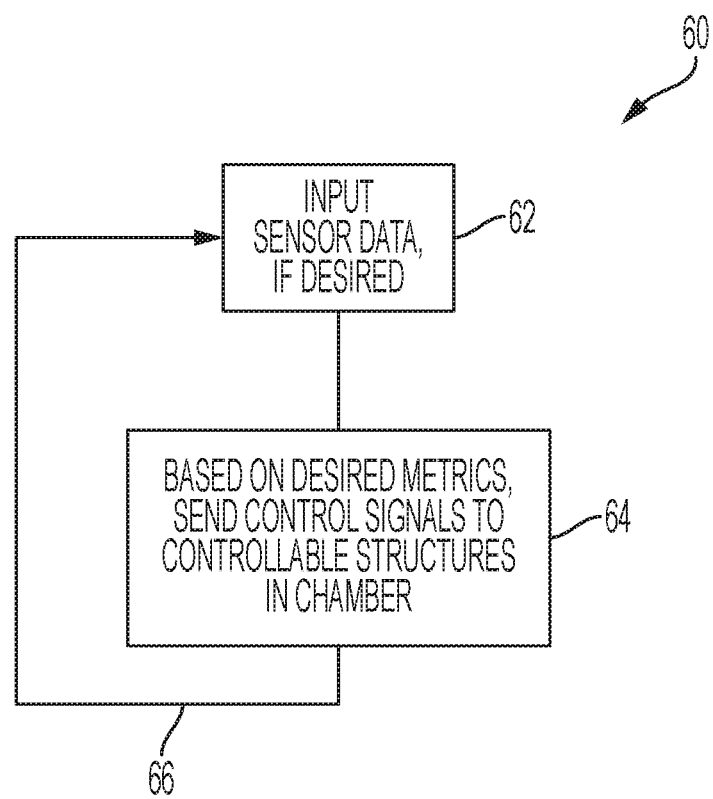
FIGS. 6 and 7 show different embodiments of control algorithms to control suitable chemical chambers as made in accordance with the principles of the present application.

FIG. 6 is one embodiment of a high level control algorithm that may be affected by the controller as discussed above. Process 60 may start at step 62 by inputting sensor data from the set of sensors that may be set up and employed within the reaction chamber, if desired. In one embodiment, a suitable process may not employ any sensor data. In such an embodiment, step 64 may employ heuristic rules based on the known thermodynamics and kinetics of the particular chemical reaction taking place within the chamber. In such a case, control structures may be sent control signals according to this rule-based process control.

In another embodiment, sensor data input at step 62 may inform the process at step 64 to send control signals to controllable structures that are based on such sensor data. In such a case, rules of thermodynamics and kinetics may be employed in conjunction with sensor data to aid in the optimizing the chemical reaction based on desired metrics. Desired metrics may include (but not limited to) reaction rate, amount of desired product produced, amount of reactants consumed, product purity, product stereochemistry and other suitable metrics. In yet another embodiment, process 60 may employ machine learning to optimize the chemical reaction according to desired metrics.

Figure 7:
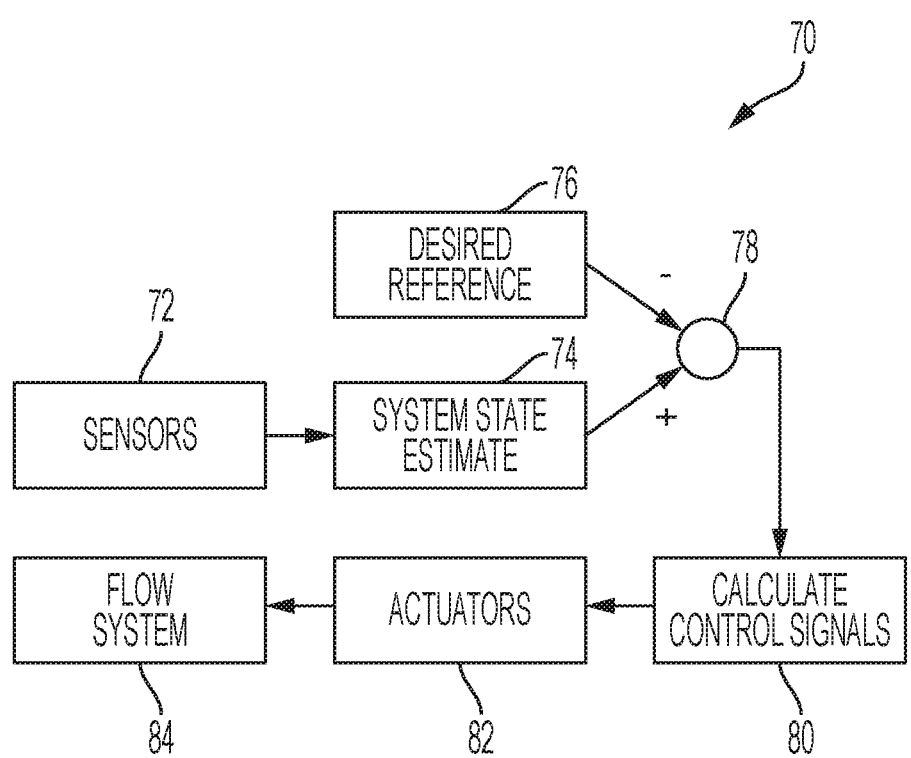

FIG. 7 is yet another embodiment of a high level control algorithm that may be affected by the controller. Process 70 starts by gathering sensor data at 72. Process 70 may take this sensor data and create a system state estimate at 74. This estimate may be compared against desired reference data at 76 to create a refinement at 78. This refinement may be input into process block 80 to calculate the control signals to send out in response to the actuators at 82. The actuators, so controlled, create an altered state within the flow system/chamber at 84. Process 70 may be iterated over the entire time (or a subset thereof) of the chemical reaction. Thus, in one embodiment, the state of the flow system/chamber (at 84) may be fed back into the sensor signals (at 72). The control system may then create an estimate of the system state from the sensor signals.

Modular Design and Smaller Form Factor Embodiment

As discussed above, the chamber may comprise the entire chemical reactor in which the chemical reaction takes place. In other embodiments, a suitable chamber may be made in a smaller form factor and/or modular design. In such a case, the present chamber may be made as a third party, aftermarket add-on to existing reactors (e.g., such as existing large batch and/or flow reactors).

Figure 8:
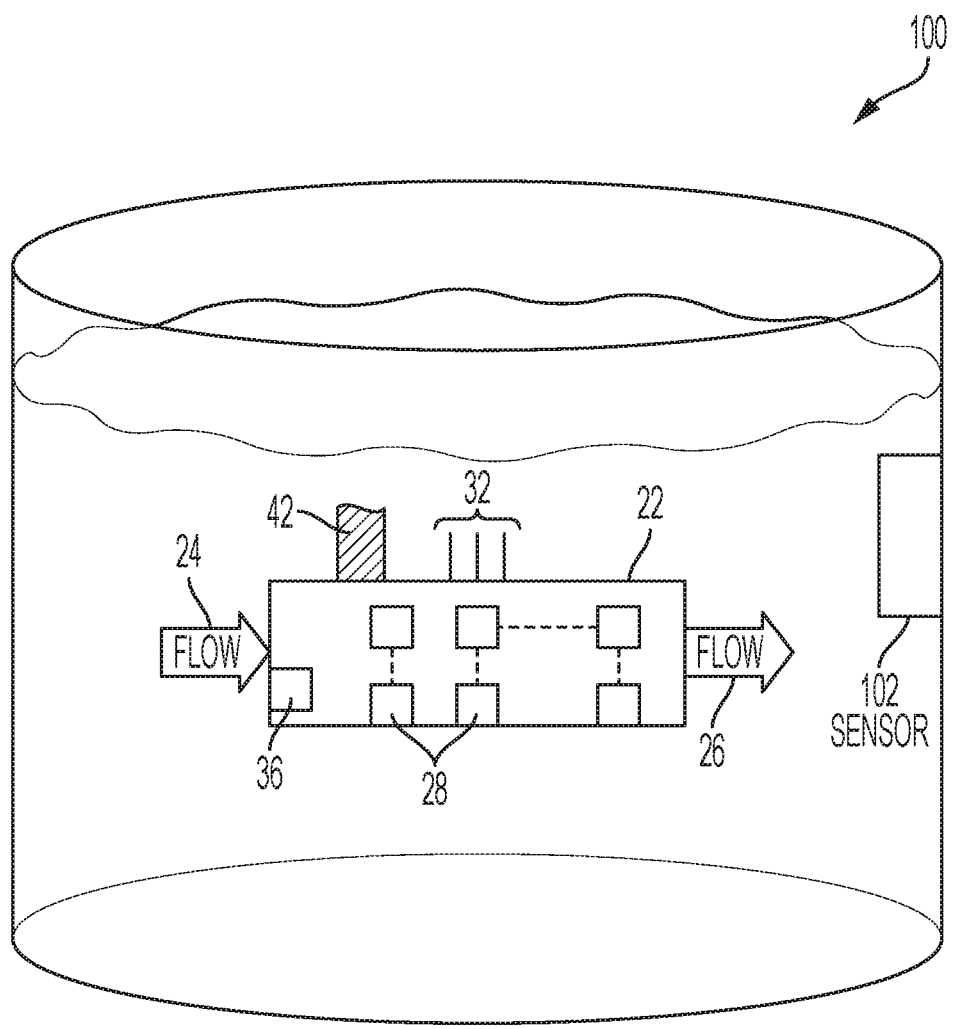
FIGS. 8 and 9A and 9B show different embodiments of modular suitable chemical chambers that may fit and be controlled within existing larger chemical reactors.

FIG. 8 depicts one embodiment of such a modular designed chamber 22. Chamber 22 may be placed (either fixedly or mobile) within an existing reactor 100 (e.g., a batch and/or flow reactor). Optional port 42 may connect chamber 22 to a source of gas and/or liquid reactants. Control lines 32 may be external to chamber 22, sending control signals to controllable features (such as pixels 28) from an external controller (not shown). Alternatively, chamber 22 may have an integral and/or internal controller and control lines 32 may be internal to chamber 22. Controller may send signals according to sensor data that may come from external sensors 102 already in the existing reactor 100, or to sensors 36 that may be integral to the chamber 22.

Input flow 14 from the chamber 100 may be the input reactants to chamber 22. Chamber 22 may perform its specific chemical reaction to produce an output flow 26. Suitable control algorithms (such as those discussed above) may be control the structures within chamber 22 in order to optimize the reaction that is taking place within the larger reactor 100.

Figure 9A:
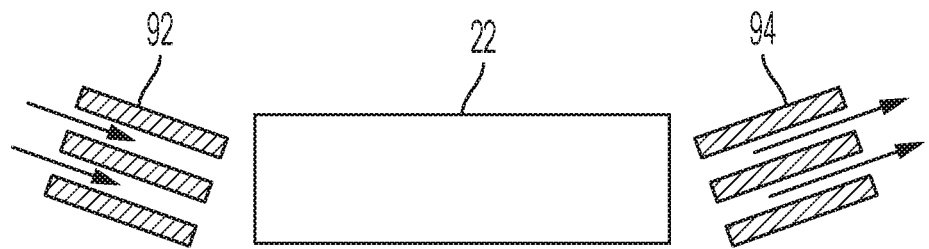
Figure 9B:
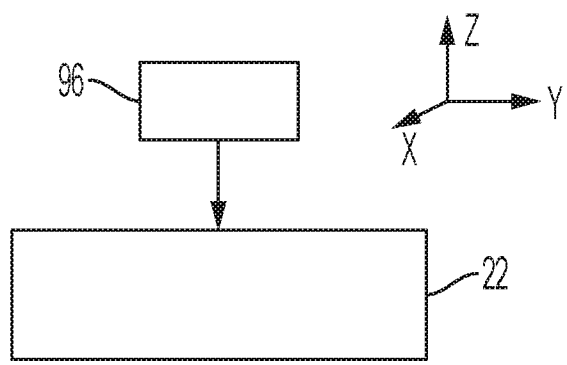

FIGS. 9A and 9B depict two embodiments of flow control structures that may be desirable to aid the chamber interact with an existing reactor. FIG. 9A shows that the chamber 22 may employ louvers and/or flow structures 92 and 94 to direct the flow of chemicals both into and out of the chamber 22. These flow structures may advantageously direct chemical flow where desired within the existing reactor. Suitable flow structures may be controlled by the controller via control signals as desired.

FIG. 9B is another embodiment of a flow control structure 96 that may be employed to affect a desired input and/or output flow of chemicals in the chamber 22. Structure 96 may be set of mechanical motors that are in communication with chamber 22. Structure 96 may be able to (possibly under control over controller) to physically move chamber 22 in a three dimensional fashion within the existing reactor.

Now that various embodiments have been herein disclosed, it is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a controller, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the controller, processor, computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

A detailed description of one or more embodiments of the application, read along with accompanying figures, that illustrate the principles of the application has now been given. It is to be appreciated that the application is described in connection with such embodiments, but the application is not limited to any embodiment. The scope of the application is limited only by the claims and the application encompasses numerous alternatives, modifications and equivalents. Numerous specific details have been set forth in this description in order to provide a thorough understanding of the application. These details are provided for the purpose of example and the application may be practiced according to the claims without some or all of these specific details. For the purpose of clarity, technical material that is known in the technical fields related to the application has not been described in detail so that the application is not unnecessarily obscured.

The invention claimed is:

1. A multi-phase chemical reaction chamber comprising:
a substrate, the substrate configured to receive a flow of chemicals for reacting within the chamber;
a set of dynamically controllable pixels, the pixels further comprising a solid surface, the solid surface comprising one of the phases of a multi-phase reaction occurring within the chamber;
a controller, the controller further comprising a processor controlled under a computer-readable set of instructions and, when read by the processor causes the controller to send control signals to the set of dynamically controllable pixels, to perform the following:
energize a subset of the dynamically controllable pixels to carry a desired voltage level, the energized pixels configured to create the formation of gas bubbles over the pixels, the gas bubbles comprising one of the phases of the multi-phase reaction occurring within the chamber.

2. The multi-phase chemical reaction chamber as recited in claim 1 wherein the pixels comprise a solid surface that is coated with a desired catalyst for the desired multi-phase chemical reaction occurring within the chamber.

3. The multi-phase chemical reaction chamber as recited in claim 1 wherein the pixels comprise a solid surface that is coated with a solid material that is consumed in the desired multi-phase chemical reaction occurring within the chamber.

4. The multi-phase chemical reaction chamber as recited in claim 1 wherein the pixels comprise electrowetting pixels.

5. The multi-phase chemical reaction chamber as recited in claim 1 wherein the chamber further comprises a set of sensors, the sensors recording data regarding chemical reaction occurring within the chamber.

6. The multi-phase chemical reaction chamber as recited in claim 5 wherein the sensors comprise one of the following: temperature, input flow rate and composition, output flow rate and composition, pH, pressure, camera and chemical assays to determine the amount of reactants, intermediate products and final products.

7. The multi-phase chemical reaction chamber as recited in claim 1 wherein the pixels further comprise a port, the port configured to introduce chemical reactants into the chamber under control of the controller.

8. The multi-phase chemical reaction chamber as recited in claim 1 wherein the pixels further comprise an energizing element, the energizing element configured to be energized by the controller.

9. The multi-phase chemical reaction chamber as recited in claim 1 wherein the pixels comprise a desired irregular surface wherein the controller is configured to modulate the energizing signal to the pixel to induce gas bubbles to move upwards and downwards as desired over the irregular surface.

10. The multi-phase chemical reaction chamber as recited in claim 1 wherein the pixels comprise a flexible surface controllable by the controller.

11. The multi-phase chemical reaction chamber as recited in claim 1 wherein the pixels comprise a MEMS structure configured to gimbal the pixel in a desired direction to the flow of chemicals within the chamber.

12. A method for controlling pixels within a multi-phase chemical reaction chamber, the chemical chamber comprising a set of dynamically controllable pixels, the pixels further comprising a solid surface, the solid surface comprising one of the phases of a multi-phase reaction occurring within the chamber, the method comprising:
   receiving input data from a set of sensors, the sensors detecting desired conditions of the chemical reaction occurring within the chamber;
   based on desired metrics, sending control signals to the set of dynamically controllable pixels to optimize the chemical reaction.

13. The method as recited in claim 12 wherein the control signals are signals to set voltage levels on the pixels.

14. The method as recited in claim 12 wherein the control signals are signals to set a temperature level on an energizing element on the pixel.

15. The method as recited in claim 12 wherein the control signals are signals to set a light emitting level on an energizing element on the pixel.

16. The method as recited in claim 12 wherein the control signals are signals to open a port on the pixel to introduce a chemical reactant proximal to the pixel.

17. A modular, multi-phase chemical reaction chamber configured to fit and operate within a larger chemical reactor, the modular chemical chamber comprising:
   a substrate, the substrate configured to receive a flow of chemicals for reacting within the chamber;
   a set of dynamically controllable pixels, the pixels further comprising a solid surface, the solid surface comprising one of the phases of a multi-phase reaction occurring within the chamber;
   a control structure, the control structure configured to direct the flow of chemical reactants into and out of the chemical chamber;
   a controller, the controller further comprising a processor controlled under a computer-readable set of instructions and, when read by the processor causes the controller to send control signals to the set of dynamically controllable pixels, to perform the following:
   energize a subset of the dynamically controllable pixels to carry a desired voltage level, the energized pixels configured to create the formation of gas bubbles over the pixels, the gas bubbles comprising one of the phases of the multi-phase reaction occurring within the chamber.

18. The modular, multi-phase chemical reaction chamber as recited in claim 17 wherein the control structure is a set of louvers, the louvers controllable by the controller to direct the flow of chemicals.

19. The modular, multi-phase chemical reaction chamber as recited in claim 17 wherein the control structure is a set of mechanical motors, the motors mechanically mated to the chamber and controllable to move the chamber to a different position within the larger chemical reactor.

20. The modular, multi-phase chemical reaction chamber as recited in claim 17 wherein the controller is configured to receive sensor data from sensors located within the larger chemical reactor.

\* \* \* \* \*